Aug. 26, 1941.　　　A. J. KINSMAN　　　2,253,565
CONTAINER
Filed May 27, 1939　　　2 Sheets-Sheet 1
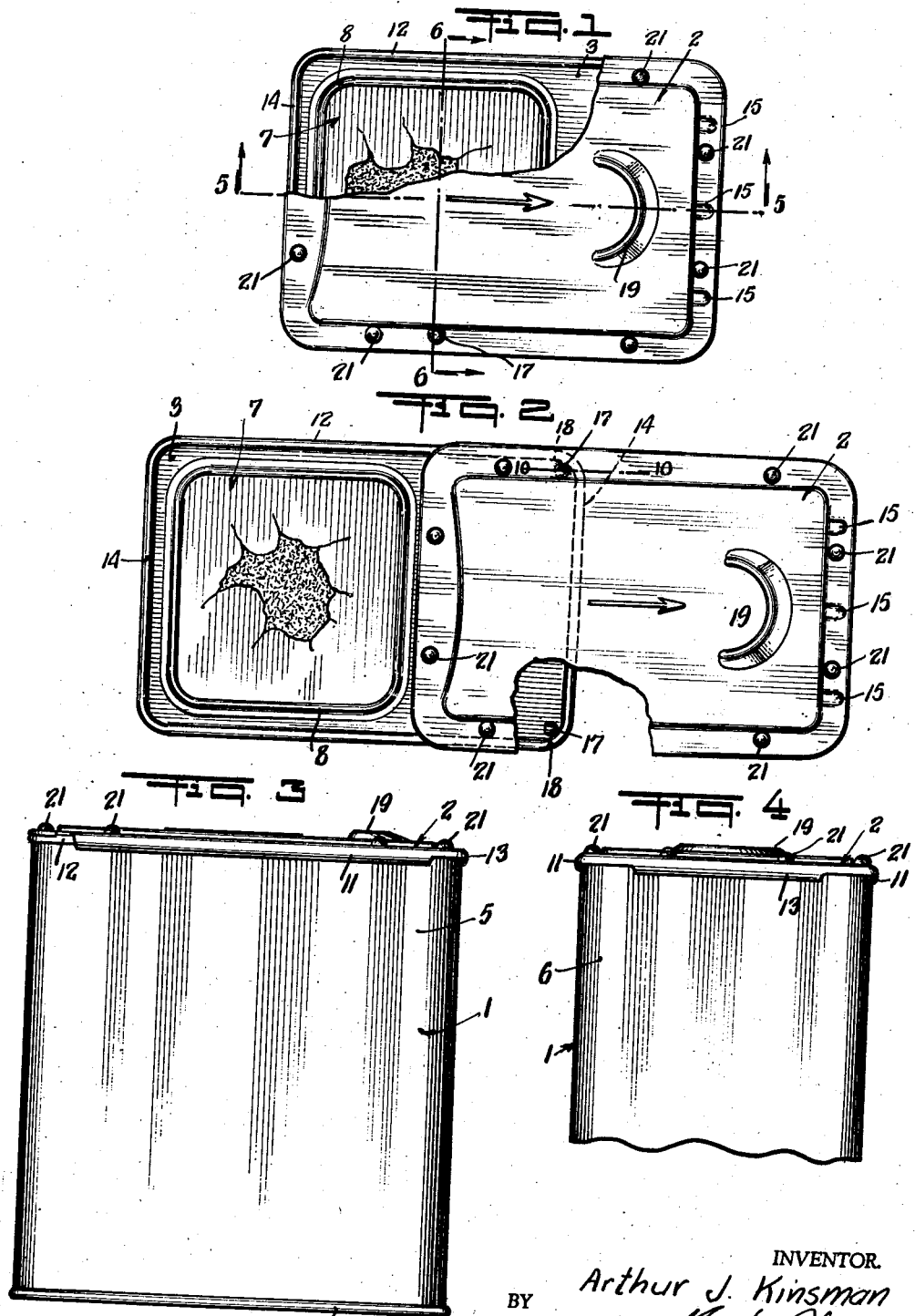
INVENTOR.
Arthur J. Kinsman
BY
ATTORNEYS

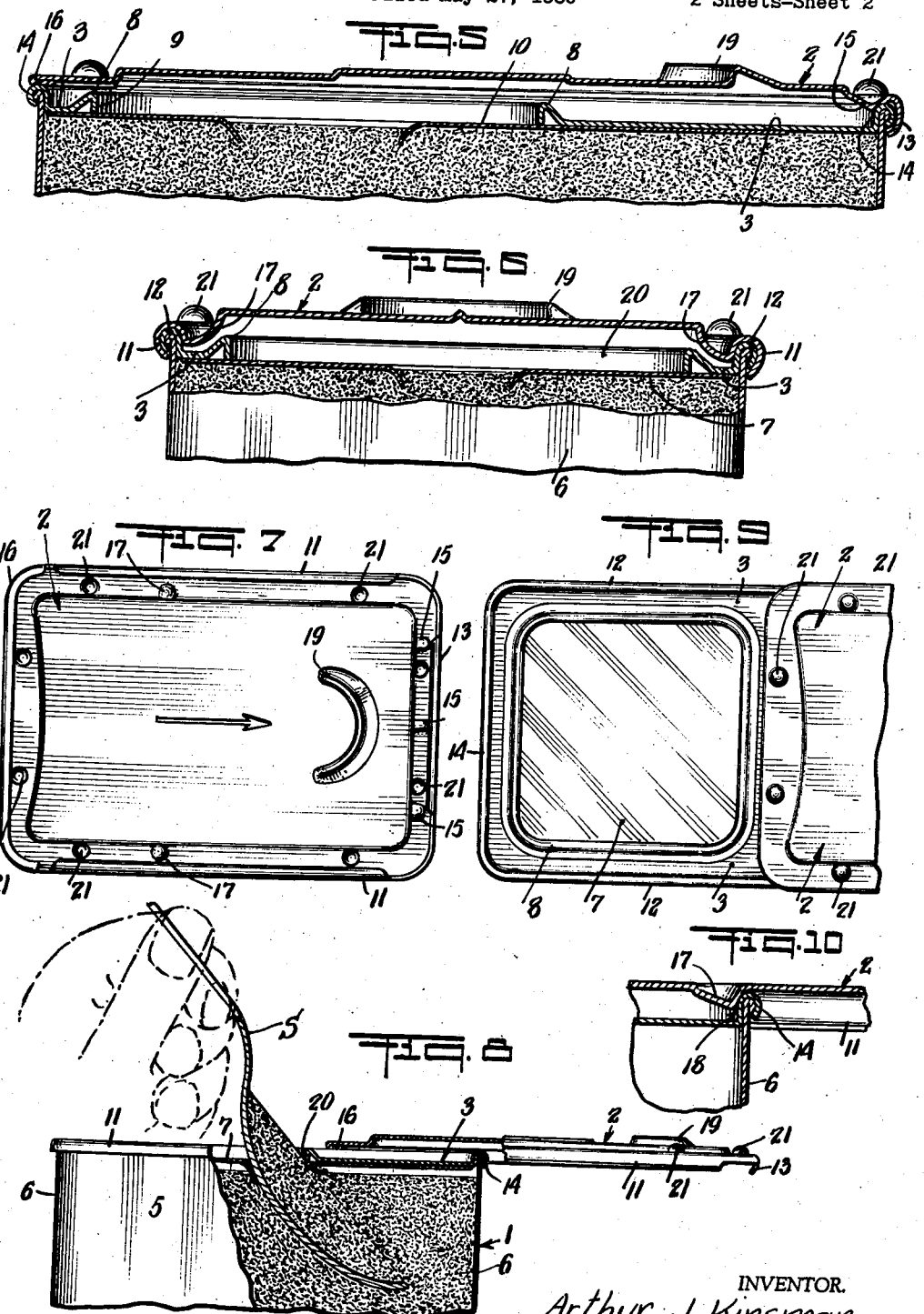

Patented Aug. 26, 1941

2,253,565

UNITED STATES PATENT OFFICE 2,253,565

CONTAINER

Arthur J. Kinsman, New York, N. Y., assignor to Purepac Corporation, New York, N. Y., a corporation of New York Application May 27, 1939, Serial No. 276,031

1 Claim. (Cl. 220—27)

My invention relates to improvements in containers of the type having a slidable cover.

One of the objects of my invention is to form a portion of the top of the container with a frangible seal which may be ruptured, thus affording access to the contents of the container.

Another object of my invention is to provide a container in which no sharp edges or ridges are present which might possibly injure the user of same.

Another object of my invention is to provide a sanitary container in which measured quantities of the contents of the container may be removed.

Another object of my invention is to form the top of the container with a transparent frangible seal, so that the contents of the container may be viewed and inspected.

Another object of my invention is to provide a sanitary container of novel and sturdy construction especially adaptable for drugs, pharmaceuticals, chemicals and food products in powdered or flaked form.

Other objects of my invention will be set forth in the following description and drawings, which illustrate a preferred embodiment thereof, it being understood that the above statement of the objects of my invention is intended generally to explain the same without limiting it in any manner.

Fig. 1 is a top plan view of my container, the cover being in closed position and shown partially broken away.

Fig. 2 is a top plan view of the container, the cover being in open position, the frangible seal broken, and part of the cover being broken away.

Fig. 3 is a front elevation of the container, the cover being in closed position.

Fig. 4 is a side elevation of same, with the bottom of the body of the container being broken away for the convenience of illustration.

Fig. 5 is a sectional view on line 5—5 of Fig. 1, the bottom of the body of the container being shown broken away.

Fig. 6 is a sectional view on line 6—6 of Fig. 1, showing only the upper part of the container in section, the greater portion of the body of the container being broken away.

Fig. 7 is a bottom plan view of the cover.

Fig. 8 is a front elevation of the container, the cover being in open position, part of said container and cover being shown in section, and the lower part of the body of the container being shown broken away. This figure also shows a spoon partially withdrawn from the container and having the contents of the withdrawn portion levelled off by the rim of the opening formed in the top of the container.

Fig. 9 is a top plan view similar to Fig. 2 but having a transparent frangible seal, and having the cover partially broken away.

Fig. 10 is a sectional view on the line 10—10 of Fig. 2.

Referring to the drawings, I generally designates the body of the container having the bottom 4, the top 3, front and rear walls 5 and side walls 6. A cover 2 is slidably mounted over top 3. My invention concerns itself principally with the top portion of the container and the sliding cover therefor. The balance of the container may be formed in the usual manner known in the art.

Referring to Figs. 2, 5 and 6, top 3 is formed with an opening or window 7, three sides of said opening being located near the peripheral edges of the container, said opening being approximately one half the size of top 3. Along the edge of said opening, a ridge or raised edge 8 is formed, said ridge having an inner vertical wall 9. The bottom of wall 9 lies in the same plane as the bottom face of top 3. Opening 7 is normally closed by a frangible sheet 10 which is secured by a suitable adhesive to the bottom or inner face of top 3. Said frangible seal may carry any advertising or printed matter. Likewise frangible sheet 10 may be made of any transparent material (as shown in Fig. 9) so that the contents of the container may be viewed or inspected prior to rupturing the seal. It will be noted that the use of a frangible seal to cover opening or window 7 results in a sanitary protection of the contents of the container against dust and foreign matter. In order to gain access to the contents of the container, frangible seal 10 may be readily broken as shown in the drawings.

Sliding cover 2 may be stamped out of a single sheet of metal or the like and is of a size sufficient to completely cover the top of the container. The longitudinal edges of cover 2 are rolled over to form groove members 11 which are adapted to slidably engage the longitudinal top beads 12 of the container. A portion of one transverse edge of cover 2 is also rolled over to form a stop 13 which abuts the corresponding bead 14 atop one of the walls 6, when the cover is in closed position on the container. A plurality of indentations 15 are formed adjacent rolled edge 12, the outer faces of said indentations press against the inner face of bead 14, thus securing cover 2 in closed position. The opposite transverse edge 16 of cover 2 is rolled under and flattened, as clearly shown in Fig. 5. The lower face of said flattened edge 16 lies in the same plane as the upper face of beads 12 and 14. The purpose of flattening edge 16 is to avoid the presentation of any sharp edges so that the container may be used with safety and security.

Referring particularly to Figs. 2 and 10, a pair of indentations or stops 17 are formed along each longitudinal edge of cover 2. Said stops serve to limit the lateral movement of cover 2 when said cover is slid into the open position, thus preventing the cover from slipping off the top of the container. It will be noted that stops 17 abut the inner face of the rounded corner 18 of bead 14 when the cover is in the position shown in Fig. 2.

As shown in the drawings, a thumb rest 19 is formed in cover 2, said thumb rest projecting above the top surface of cover 2 and being generally of crescent shape. Projections 21 positioned adjacent the periphery of cover 2 are provided merely for ornamental purposes.

It will be noted that when cover 2 is in its fully extended position as shown in Figs. 2 and 8, edge 16 of cover 2 extends slightly beyond the right hand end of window 7.

Fig. 8 of the drawings illustrates a method of obtaining a level teaspoon of the contents of the container. Spoon S has its measuring end inserted into the contents of container through window 7 and is withdrawn along the inner edge 20 of window 7. In this manner the excess over the plane of the teaspoon is levelled off, thus providing a definite measured quantity of material.

I have shown a preferred embodiment of my invention but it is obvious that numerous changes and omissions may be made without departing from its spirit. My invention is not to be limited to any particular type or shape of container. It may be readily applied to metallic and non-metallic containers.

I claim:

A container of the class described having a body portion, a top member having a depressed main portion leaving raised peripheral edges secured to the body portion of the container, said depressed portion being provided with a window adjacent one edge of the container and spaced a substantial distance from the opposite edge thereof, said window having a continuous peripheral ridge projecting upwardly therefrom and having an inner vertical wall lying in the same plane as the inner face of the top member, a frangible member secured to the inner face of the top member and closing the window, the window ridge and its vertical wall terminating below the top of the raised peripheral edges of the top member, and a cover member slidably engaging said raised peripheral edges of the top member and adapted to move above the window ridge and vertical wall, a stop member to position said cover in its closed position to completely cover the top member and window, and a second stop member adapted to limit the opening of the cover when its sliding movement has completely uncovered the window.

ARTHUR J. KINSMAN.